Oct. 31, 1961 J. WOODHEAD 3,006,200

MOTION CONVERTING APPARATUS

Filed Aug. 19, 1958

INVENTOR
JAMES WOODHEAD
BY Hane and Nydick
ATTORNEY

United States Patent Office 3,006,200
Patented Oct. 31, 1961

3,006,200
MOTION CONVERTING APPARATUS
James Woodhead, Allwynds, Sollershott West, Letchworth, England, assignor to International Computers and Tabulators Limited, London, England, a British company
Filed Aug. 19, 1958, Ser. No. 756,014
12 Claims. (Cl. 74—30)

This invention relates to apparatus for converting continuous rotary motion into reciprocating motion.

It is an object of the invention to provide an arrangement by which a continuously rotating shaft produces a reciprocating movement, the linear speed being directly proportional to the speed of rotation of the shaft during the major part of a cycle of reciprocatory movement.

It is a further object of the invention, to provide a device for driving the reciprocating carriage of a typewriter, or the like.

According to one aspect of the invention, in apparatus for producing relative reciprocating motion between a rotatable driving shaft and an elongated driven member means are provided to maintain continuous driving contact between the driven member and the periphery of a circular driving member secured to the driving shaft and to cause the point of driving contact of the two members to move once round the axis of the shaft during on cycle of reciprocatory motion.

According to another aspect of the invention apparatus is provided for producing relative reciprocating motion between a driving member rotatable in one direction about a fixed axis and an elongated member mounted longitudinally on a support member movable along a line parallel to the longitudinal axis of the elongated member, in which the elongated member is maintained in continuous driving contact with the periphery of the driving member during one cycle of reciprocatory motion the point of driving contact lying on one side of the rotational axis of the driving member when the support member is moving in one direction and lying on the opposite side of the rotational axis when the support member is moving in the opposite direction and having means for transferring the end of the elongated member in contact with the driving member from one side of the rotational axis to the opposite side at the limit of travel of the support member in each direction.

According to a further aspect of the invention the elongated member is fixed and co-operates with a driving member rotatable in one direction and mounted on a support member moveable in response to the co-operation of the driving member with the elongated member along a line parallel to the longitudinal axis of the elongated member.

The invention will now be described, by way of example, with reference to the accompanying drawing, in which.

Figure 1:
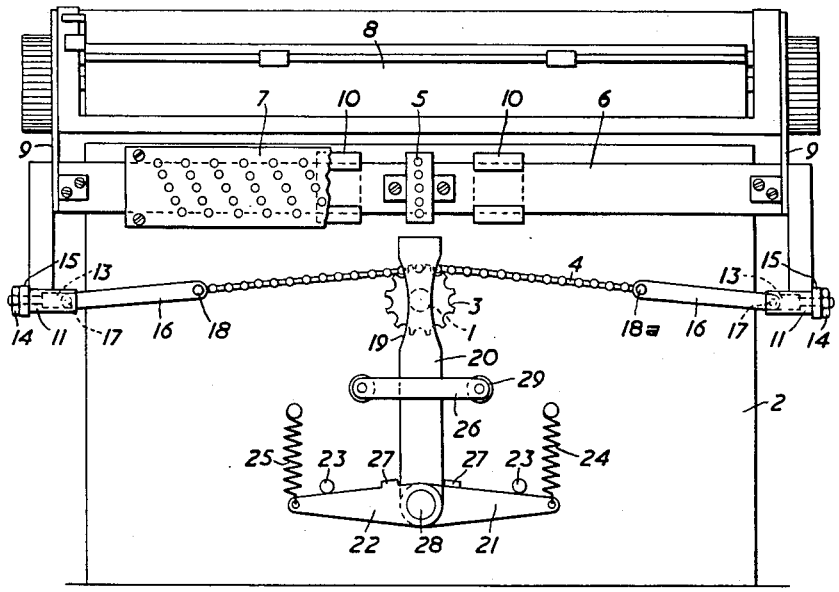
FIGURE 1 is an elevation of arrangement for driving a typewriter carriage.

A shaft 1 (FIGURES 1 and 2) is mounted in bearings in a supporting plate 2. The shaft 1 is driven at constant speed and it carries a sprocket 3, which engages a roller chain 4. The ends of the chain 4 are connected through connectors 16 to two vertical extensions of a horizontal support bar 6. The bar 6 is mounted for reciprocation in two guides 10 which are attached to the plate 2. The bar carries side members 9 which support a platen 8.

Figure 2:
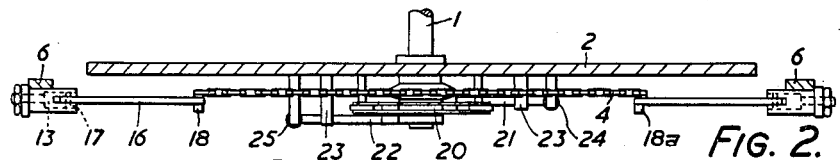
FIGURE 2 is a sectional plan view of the arrangement shown in FIGURE 1.

If the sprocket 3 is rotated clockwise it will drive the chain 4 to the right as seen in FIGURE 1. The chain will be driven at a substantially constant speed determined by the speed of rotation of the shaft 1 and the number of teeth on the sprocket 3. Since the chain 4 is connected by the connectors 16 to the carriage assembly consisting of the support bar 6, the side members 9 and the platen 8, the carriage will also be moved at a substantially constant speed towards the right. As the end of the chain reaches the sprocket 3 a pin 18, which secures one end of the chain to one of the connectors 16, engages a cam face 19 of a pivoted transfer cam 20. The cam 20 is pivoted on a stud 28 on which are also pivoted arms 21 and 22. The outer ends of the arms 21 and 22 are connected to springs 24 and 25 respectively. These springs hold lugs 27 on the arms 21 and 22 against the cam 20, so that it is normally held in a central position, as shown in FIGURE 1.

Figure 3:
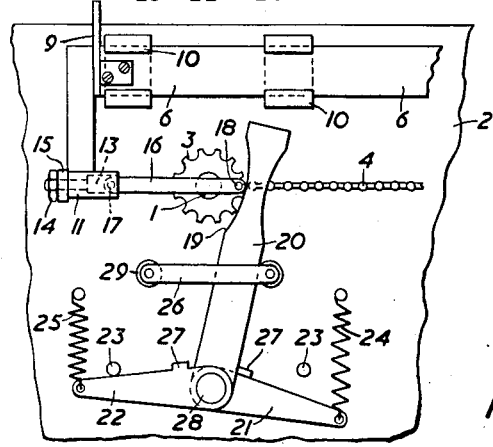
FIGURE 3 is a detailed view showing the position of certain parts at the limit of travel of the carriage in one direction.

When the transfer cam 20 is engaged by the pin 18, the cam is moved away from the central position, against the action of the spring 24, towards the extreme position shown in FIGURE 3. The cam face 19 acting on the pin 18 holds the end roller of the chain 4 in contact with the sprocket 3. The arm 22 is retained by a stop 23 shortly after the cam 20 starts moving, so that the full force of the spring 24 is exerted to maintain the end roller of the chain in contact with the sprocket. As the sprocket 3 continues to rotate, the pin 18 moves in an arc of a circle around the shaft 1 to the position shown in FIGURE 3 and continues to move along the same path until it is vertically below the axis of the shaft 1. The end roller of the chain is held in contact with the sprocket by the cam 20 during all this movement. At this point a tooth of the sprocket picks up the next roller in the chain 4, which is now driven towards the left as seen in FIGURE 1 and continues to move a constant speed until a pin 18a, at the other end of the chain, engages the cam 20. The pin and the cam guide the chain 4, until it is once more on top of the sprocket 3, in a manner similar to that just described. A strip 26 provides additional support for the cam 20 and the mounting screws for this strip support rubber grommets 29, which cushion the extreme movement of the cam 20.

In the two limiting positions of carriage movement the links 16 and the chain 4 lie in a horizontal line, whereas in all other carriage positions the chain 4 is above or below the axis of the shaft 1. For this reason each of the connectors 16 is resiliently mounted. Each link 16 is connected by a pin 17 to a slide 13. The slide is free to move in a block 11 which is attached to one of the arms of the bar 6. A portion of the slide 13 extends beyond the block 11 and carries a rubber washer 15 and a retaining nut 14. The resilience of the washers 15 is sufficient to maintain the chain 4 taut at all times. The slide 13 is flat to prevent twisting of the chain.

The speed of travel of the carriage is substantially constant except during the period when the roller at either end of the chain is travelling round the sprocket. The movement of the end roller of the chain round the sprocket together with the resilient mountings of the links 16 provides a smooth reversal of the movement of the carriage with a minimum of shock. This allows the carriage to be moved at relatively high speeds during the major portion of its travel. Although the speed of the carriage movement may be changed by utilising a sprocket with a different number of teeth, it will be apparent that the diameter of the sprocket should be too great since this would entail an undesirably large movement by the slides 13.

The extent of movement of the carriage is determined entirely by the length of the chain 4. Thus any desired movement of the carriage may be obtained by using an appropriate length of chain 4 with suitable connectors 16, without the necessity for altering any other part of the arrangement.

A group of five contact brushes 5 are secured to the bar 6. These brushes co-operate with contacts of a column commutator 7 which is attached to the main plate 2. This commutator is similar to that generally used on step-by-step record card punches. This commutator provides a continuous indication of the column position of the carriage and may be used to control printing at pre-determined column positions.

The shaft 1 may be driven through a clutch (not shown), which may be engaged and disengaged under control of signals from the carriage commutator, or an external source, to stop and start the movement of the carriage. The carriage may be stopped at either end of its travel by moving the lever 20 sufficiently far from the central position to prevent it holding the end roller of the chain 4 in contact with the teeth of the sprocket 3.

The lever 20 may be replaced by a pair of plates in which are cam grooves engaged by the pins 18 and 18a. The pins 18 and 18a in this case extend from opposite sides of the chain, so that each pin is free to engage its associated cam plate. By arranging the cam plates so that they may be moved a short distance away from the axis of the shaft 1, under control of an electro-magnet, for example, the end rollers of the chain may be positively disengaged from the sprocket at either end of the carriage movement, as the pin 18, or 18a, follows the cam groove.

It will be appreciated that the mechanism described above is not limited in use to driving a typewriter carriage, but is generally applicable for converting rotary to reciprocating motion. It might be used, for example to produce movement of a magnetic or photo-electric sensing head over a document bearing data-representing marks in order to scan the marks.

From the foregoing description it will be apparent that reciprocatory motion is derived from driving an elongated member such as the chain by means of a rotating driving member, such as the sprocket, and that the mechanism is reversed by holding the end of the chain in engagement with the sprocket and passing the end roller in an arcuate path round the periphery of the sprocket, so that the point of driving engagement between the chain and the sprocket is transferred from one side of the rotational axis of the sprocket to the other. It follows, then, that the elongated member need not be a chain. For example a wire or rubber member may be used, the drive being obtained by the use of a suitable pulley or wheel held in frictional engagement therewith.

Moreover, a rigid elongated member may be used, such as a double sided rack engageable with a pinion. For this case, however, since the elongated member is not flexible, it is supported between vertical slides, so that the entire member is bodily displaced relative to the support as the end is passed round the pinion, the ends of the rack having teeth to engage the pinion for this purpose.

Furthermore, since the operation of the mechanism described above produces a relative reciprocatory motion between the driving shaft and the elongated member it will be appreciated that the driving shaft may be mounted on the carriage and the elongated member on the frame upon which the carriage is supported. The transfer mechanism is also mounted on the carriage and the apparatus functions in the manner described. This alternative disposition of the component parts is particularly suitable for self-contained carriage mechanisms which carry a drive motor arranged to control the feeding of paper, for example by means of clutches which couple the motor to the paper feeding devices. In this case the motor is also geared to the driving shaft and all paper and carriage movements are then controlled by the same driving motor.

I claim:

1. Motion converting apparatus comprising a generally circular disc shape drive member mounted for rotation about an axis through the center and normal to the plane of the disc; driving means operatively connected to the disc to impart unidirectional rotation thereto; a driven member having two opposite longitudinal sides; mounting means carrying independently the drive member and the driven member, said driven member being so positioned that one of its sides is in engagement with the periphery of the disc, rotation of the disc producing relative motion between the disc and driven member substantially in the direction of the longitudinal axis of the driven member; stop means at both ends of the driven member; and cam means operative when the point of engagement between the disc and the driven member is at either end of the driven member to engage the stop means and maintain the driven member in engagement with the disc, continued rotation of the disc when in engagement with one end of the driven member transferring the point of engagement from one side to the other side of the driven member and when engaging the other end transferring the point of engagement from said other side to said one side, said mounting means permitting limited movement of the driven member transversely to the length thereof in the plane of the disc.

2. Apparatus comprising a generally circular disc shape drive member mounted for rotation about an axis through the center and normal to the plane of the disc; driving means operatively connected to the disc to impart unidirectional continuous rotation thereto; a driven member having two opposite longitudinal sides; mounting means carrying the disc and the driven member and permitting linear reciprocating motion of the driven member in the direction of the longitudinal axis thereof, the periphery of said disc being in engagement with one of the sides of the driven member; cam means on said mounting means; stop means at both ends of the driven member, said cam means being positioned to engage the stop means at and towards the limits of said reciprocating motion of the driven member to hold the disc in driving engagement with the driven member, the driven member being mounted for limited movement transverse to the longitudinal axis in the plane of the disc, said cam means, on continued rotation of the disc when in engagement with one of the stops at one end of one of said sides of the driven member, holding said one end of the member in engagement with the disc and causing that end of the driven member to be driven around the axis of the disc until the disc engages the other of said sides.

3. Apparatus according to claim 2 in which the driven member is flexible, said mounting means tensioning the driven member extended in said direction of said longitudinal axis of said elongated member.

4. Apparatus according to claim 3 in which the driven member is a roller chain and the disc a toothed sprocket wheel.

5. Apparatus according to claim 2 in which said mounting means includes a fixed framework, means supporting the disc and the driving means on the framework and permitting said rotation of the disc, a carriage assembly, means supporting the driven member on the carriage assembly, and slide means on the framework and the carriage assembly co-operatively engaged to permit linear reciprocation of the carriage assembly relative to the framework parallel to the longitudinal axis of the driven member.

6. Apparatus according to claim 5 in which the driven member is flexible, said carriage assembly includes a pair of spaced members and said driven member supporting means includes a pair of rigid connectors, one for each end of the driven member and each having one end connected to the respective end of the driven member and the other end to a respective one of said spaced members, the two connectors with the driven member between them stretching from the one spaced member to the other.

7. Apparatus according to claim 6 in which the connectors are pivotally connected to said spaced members to enable them to pivot in the plane parallel to that of the disc and containing the longitudinal axis of the driven member, the length of the driven member being greater than the distance between the ends of said connectors to which it is connected.

8. Apparatus according to claim 7 in which the driven member is a roller chain and the disc is a toothed sprocket wheel.

9. Apparatus comprising a fixed framework and a carriage assembly slidably mounted on said framework for linear reciprocation relative thereto in a predetermined direction, a drive member in the form of a generally circular disc mounted on said framework for rotation about the axis passing through its center normal to its plane, driving means for imparting continuous unidirectional rotation to the disc about said axis, a driven member, supporting means for supporting the driven member on the carriage assembly in driving engagement with the periphery of the disc and with the longitudinal axis of said driven member lying in said predetermined direction, the supporting means permitting movement of the driven member normal to said longitudinal axis and parallel to the plane of the disc between extreme positions in which it is engaged with diametrically opposite points on the periphery of the disc, stop means at each end of the driven member and cam means mounted on said framework adjacent to the disc to engage said stop means when either end of the driven member approaches the disc, the cam means cooperating with the stop means on engagement to hold the end of the driven member arriving at the disc in contact with the periphery of the disc, and, on continued rotation of the disc while said end is held in engagement therewith, to cause that end to be driven around the axis of the disc until the periphery of the disc engages the driven member on the opposite side to that with which it was in contact immediately prior to the engagement of the stop and cam means.

10. Apparatus comprising a fixed framework and a carriage assembly slidably mounted on said framework for linear reciprocation relative thereto in a predetermined direction, a toothed sprocket wheel mounted on said framework for rotation about an axis through its center and normal to its plane, driving means for imparting continuous unidirectional rotation to the sprocket wheel, a roller chain, means for supporting the chain on said carriage assembly with said roller chain extending in said predetermined direction and in driving engagement with the periphery of the sprocket wheel, the supporting means permitting limited movement of the chain in the plane of the sprocket wheel normal to said predetermined direction, stop means secured to each end of the chain, and cam means mounted on said framework adjacent to the sprocket wheel to engage said stop means when either end of the roller chain comes into engagement with the sprocket wheel, the cam means cooperating with the stop means on engagement to hold the end roller of the chain in contact with the periphery of the sprocket wheel and, on continued rotation of the sprocket wheel, to cause said end roller to be driven round the axis of the sprocket wheel until the teeth of the sprocket wheel can engage the chain on the opposite side to that with which it was in contact immediately prior to the engagement of the stop and cam means.

11. Apparatus according to claim 10 in which the stop means are pins projecting to one side from the ends of the chain, each pin lying parallel to the axis of the sprocket wheel, and the cam means includes an arm mounted beside the sprocket wheel and spaced from the face thereof which is directed to said one side, by a distance less than the length of said pins.

12. Apparatus according to claim 11 in which said arm is mounted to pivot about an axis parallel to that of the sprocket wheel and positioned so that a line at right angles to the two axes is also substantially at right angles to the longitudinal axis of the roller chain, spring restraining means exerting opposed moments of force on said arm to maintain it in the angular position in which it intersects the direction of the axis of the sprocket wheel and cam stop means positioned on either side of said arm to limit rotation of said arm about said axis to a predetermined arc, engagement of said arm with one of said pins causing displacement of the arm against one of said cam stop means and extension of said spring restraining means to increase one of said couples thereby exerting a force maintaining the arm in contact with the pin.

References Cited in the file of this patent

UNITED STATES PATENTS

| | | |
|---|---|---|
| 870,005 | Wirtz et al. | Nov. 5, 1907 |
| 933,904 | Huse | Sept. 14, 1909 |
| 2,521,564 | Bernard | Sept. 5, 1950 |
| 2,685,260 | Auger | Aug. 5, 1954 |

FOREIGN PATENTS

| | | |
|---|---|---|
| 272,905 | Switzerland | Apr. 2, 1951 |